United States Patent
Bruso et al.

(10) Patent No.: US 12,353,386 B2
(45) Date of Patent: *Jul. 8, 2025

(54) METHOD OF BUILDING AND APPENDING DATA STRUCTURES IN A MULTI-HOST ENVIRONMENT

(71) Applicant: Unisys Corporation, Blue Bell, PA (US)

(72) Inventors: Kelsey L. Bruso, Eagan, MN (US); James M. Plasek, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,602

(22) Filed: Oct. 25, 2023

(65) Prior Publication Data

US 2024/0054122 A1 Feb. 15, 2024

Related U.S. Application Data

(63) Continuation of application No. 17/542,553, filed on Dec. 6, 2021, now Pat. No. 11,899,640.

(51) Int. Cl.
*G06F 16/22* (2019.01)
*G06F 16/23* (2019.01)

(52) U.S. Cl.
CPC ...... *G06F 16/2246* (2019.01); *G06F 16/2343* (2019.01); *G06F 16/2379* (2019.01)

(58) Field of Classification Search
CPC ............ G06F 16/2246; G06F 16/2379; G06F 16/2343
See application file for complete search history.

(56) References Cited

U.S. PATENT DOCUMENTS

| | | |
|---|---|---|
| 7,007,040 B1 | 2/2006 | Duke et al. |
| 7,363,284 B1 | 4/2008 | Plasek et al. |
| 8,868,531 B2 | 10/2014 | Majnemer et al. |

(Continued)

*Primary Examiner* — Huawen A Peng
(74) *Attorney, Agent, or Firm* — Shook, Hardy & Bacon

(57) ABSTRACT

A processor-based method of building and appending data structures in a multi-host environment includes creating and storing data into a first data structure having a first root node, a first right leaf node and a plurality of other leaf nodes and non-leaf nodes defining multiple hierarchical levels; allowing a search of the first data structure to proceed while creating a second data structure that includes a second root node, a second left leaf node and a plurality of leaf nodes and non-leaf nodes defining multiple hierarchical levels; receiving a command to append the second data structure to the first data structure during searching the first data structure; creating a global lock for all hosts in the multi-host environment to the first root node and the first right leaf node of the first data structure while allowing access to the plurality of other leaf nodes and non-leaf nodes of the first data structure; updating the first root node and the first right leaf node with information about the second data structure; committing the update of the first root node and the first right leaf node; releasing the global lock to the first root node and the first right leaf node; and sending updated copies of the first root node and the first right leaf node to other hosts in a multi-host environment.

18 Claims, 14 Drawing Sheets

(56) References Cited

U.S. PATENT DOCUMENTS

| | | | |
|---|---|---|---|
| 9,361,332 B2 * | 6/2016 | Benjamin-Deckert | ..................... G06F 16/1727 |
| 9,940,290 B2 | 4/2018 | McKenney | |
| 10,031,921 B2 | 7/2018 | Snibbe et al. | |
| 11,055,271 B2 | 7/2021 | McKenney | |
| 11,086,524 B1 * | 8/2021 | Sun | .................. G06F 3/0604 |
| 11,537,634 B2 * | 12/2022 | Jernigan | .............. G06F 16/2322 |
| 11,714,795 B2 * | 8/2023 | Legler | ................. G06F 16/9027 707/797 |
| 2011/0252067 A1 | 10/2011 | Marathe et al. | |
| 2013/0138896 A1 | 5/2013 | McKenney | |
| 2016/0034356 A1 * | 2/2016 | Aron | ................... G06F 16/2246 707/649 |
| 2016/0070618 A1 | 3/2016 | Pundir et al. | |
| 2017/0344590 A1 | 11/2017 | Aron et al. | |
| 2017/0366407 A1 | 12/2017 | Spivak et al. | |
| 2018/0089250 A1 * | 3/2018 | Collins | ............... G06F 16/2343 |
| 2018/0336261 A1 * | 11/2018 | Reese | .................. G06F 16/2246 |
| 2021/0042336 A1 * | 2/2021 | Hatfield | ................ G06F 3/0685 |
| 2022/0261386 A1 * | 8/2022 | Negi | ................... G06F 16/2343 |
| 2023/0086449 A1 * | 3/2023 | Legler | ................... G06F 16/901 707/797 |

\* cited by examiner

METHOD OF BUILDING AND APPENDING DATA STRUCTURES IN A MULTI-HOST ENVIRONMENT

RELATED APPLICATIONS

This application is a continuation of U.S. application Ser. No. 17/542,553, filed Dec. 6, 2021.

FIELD OF THE DISCLOSURE

This invention relates to a system and method for constructing a data structure; and, more specifically, relates to a mechanism for constructing a tree structure in a more efficient manner in a multi-host environment.

BACKGROUND

Computers are used today to store large amounts of data. Such information is often stored in information storage and retrieval systems referred to as databases. This information is stored and retrieved from a database using an interface known as a database management system (DBMS). One type of DBMS is called a Relational Database Management System (RDBMS). An RDBMS employs relational techniques to store and retrieve data. Relational databases are organized into tables, wherein tables include both rows and columns, as is known in the art. A row of the horizontal table may be referred to as a record.

One type of data structure used to implement the tables of a database is a B-tree. A B-tree can be viewed as a hierarchical index. The root node is at the highest level of the tree, and may store one or more pointers, each pointing to a child of the root node. Each of these children may, in turn, store one or more pointers to children, and so on. At the lowest level of the tree are the leaf nodes, which typically store records containing data.

In addition to the pointers, the non-leaf nodes of the B-tree also store at least one key value used to search the tree for a particular data record. For instance, assume a node stores a first key value, and first and second pointers that each point to a child node. According to one exemplary organizational structure, the first pointer may be used to locate the child node storing one or more key values that are less than the first key value, whereas the second pointer is used to locate the child storing one or more key values greater than, or equal to, the first key. Using the key values and the pointers to search the tree in this manner, a node may be located that stores a record associated with a particular key value that is used as the search key.

DBMS applications typically build B-trees according to the following process. The DBMS application obtains a first record having a first key value that is to be added to a new B-tree. A root node is created that points to a leaf node, and the record is stored within the leaf node. When a second record is received, the key value stored within the root node and the second record will be used to determine whether the second record will be stored within the existing leaf node or within a newly created leaf node. The point of insertion will be selected so that all records are stored in a sort order based on the key values. Similarly, as additional records are received, the records are added to the tree by traversing the tree structure using the key values to locate the appropriate location of insertion, then adding leaf nodes as necessary. Whenever it is determined that the root or an intermediate, non-leaf node has too many children, that node is divided into two nodes, each having some of the children of the original node. Similarly, it is determined that a record must be added to a leaf node that is too full to receive the record, the leaf node must be split to accommodate the new addition.

The foregoing approach of building trees in a top down manner is generally employed when a tree is created from a stream of unsorted records. In this situation, the relationship existing between the key values of two sequentially received records is unknown. As a result, the tree must always be searched to find the appropriate location for insertion of the record.

Another consequence of the foregoing mechanism involves the allocation of storage space. Generally, each node of the tree is stored in an addressable portion of storage space that can be retrieved using a single I/O operation. This portion of storage space may be referred to as a "page". When adding records to a node, it may be desirable to store this information in a way that will allow additional information to be readily inserted into the page that stores the node. For example, it may be desirable to reserve space between two records having non-sequential key values so that a record having an intermediate key value can be inserted onto the page without having to move any of the existing records. This objective complicates the building of B-trees from a stream of unsorted records.

In some situations, a DBMS application builds a tree structure from a stream of sorted records. That is, a known relationship exists between the key and/or index values of sequentially received records. For example, it may be known that the key value of a first record will be less than that of the record that is encountered next, which, in turn, will be less than that of the record received thereafter. In this type of situation, it may be advantageous to build the B-tree from the bottom up. According to this scenario, a page is allocated to a leaf node. Records are stored in the leaf node according to the order of receipt. Since the records are sorted, no space needs to be reserved for later insertion of additional records. When the page is full, a non-leaf, or "index", node is created to point to this leaf node. A second pointer is stored within this "index" node to point to a second newly-created leaf node which will receive the next sequence of records. When the first index node is full, a second index node is added that points to the first index node. This second index node will also point to another leaf node, and the process will be repeated.

Several disadvantages exist with the foregoing approach to building a B-tree. First, as records are added to the tree, the tree becomes unbalanced. In other words, the number of levels of hierarchy existing between the root node and a given leaf node may vary widely. For instance, in the foregoing example, two levels of hierarchy exist between the second index node and the records that were received first. Only one level of hierarchy exists between the second index node and latter received records. This disparity will continue to grow as hierarchical levels are added to the tree. As a result, search times will not be uniform, but will depend on which leaf node stores a particular record.

One way to address the foregoing problem is to re-balance the tree after it is constructed. This involves "shuffling" nodes so that all paths to the leaf nodes approximately traverse the same number of hierarchical levels. To do this, some existing links between hierarchical levels are severed and new links are created. Additionally, some pages may be divided in half to allow room to add the additional links. This re-balancing activity is time-consuming.

Another problem with the foregoing mechanism involves the latency associated with data availability. In general, data is not available to a user as a table is being constructed. If a large number of records are received for entry into a table, none of the data will be available until the entire table is constructed. This time could be prohibitively large. Thus, a system and method is needed to address the foregoing limitations.

SUMMARY

In a first aspect of the present invention, a processor-based method of building and appending data structures in a multi-host environment includes: creating and storing data into a first data structure having a first root node, a first right leaf node and a plurality of other leaf nodes and non-leaf nodes defining multiple hierarchical levels; allowing a search of the first data structure to proceed while creating a second data structure that includes a second root node, a second left leaf node and a plurality of leaf nodes and non-leaf nodes defining multiple hierarchical levels; receiving a command to append the second data structure to the first data structure during searching the first data structure; creating a global lock for all hosts in the multi-host environment to the first root node and the first right leaf node of the first data structure while allowing access to the plurality of other leaf nodes and non-leaf nodes of the first data structure; updating the first root node and the first right leaf node with information about the second data structure; committing the update of the first root node and the first right leaf node; releasing the global lock to the first root node and the first right leaf node; and sending updated copies of the first root node and the first right leaf node to other hosts in a multi-host environment.

In a second aspect of the present invention, a computer program product, comprising a non-transitory computer readable medium comprising instructions which, when executed by a processor of a computing system, cause the processor to perform the steps of: creating and storing data into a first data structure having a first root node, a first right leaf node and a plurality of other leaf nodes and non-leaf nodes defining multiple hierarchical levels; allowing a search of the first data structure to proceed while creating a second data structure that includes a second root node, a second left leaf node and a plurality of leaf nodes and non-leaf nodes defining multiple hierarchical levels; receiving a command to append the second data structure to the first data structure during searching the first data structure; creating a global lock for all hosts in the multi-host environment to the first root node and the first right leaf node of the first data structure while allowing access to the plurality of other leaf nodes and non-leaf nodes of the first data structure; updating the first root node and the first right leaf node with information about the second data structure; committing the update of the first root node and the first right leaf node; releasing the global lock to the first root node and the first right leaf node; and sending updated copies of the first root node and the first right leaf node to other hosts in a multi-host environment.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

The following description provides exemplary embodiments of the current invention, which is a system and method for building a hierarchical data structure. The exemplary embodiments focus on the invention system and method as it may be employed within a database management system. However, the invention may be adapted for use with knowledge base systems, decision support systems, and data warehouses. In general, any other type of system that uses a B-tree or B+ tree as its data structure may usefully employ the invention. This may include spell checkers, spreadsheets, or any other similar application maintaining sorted data.

Figure 1:
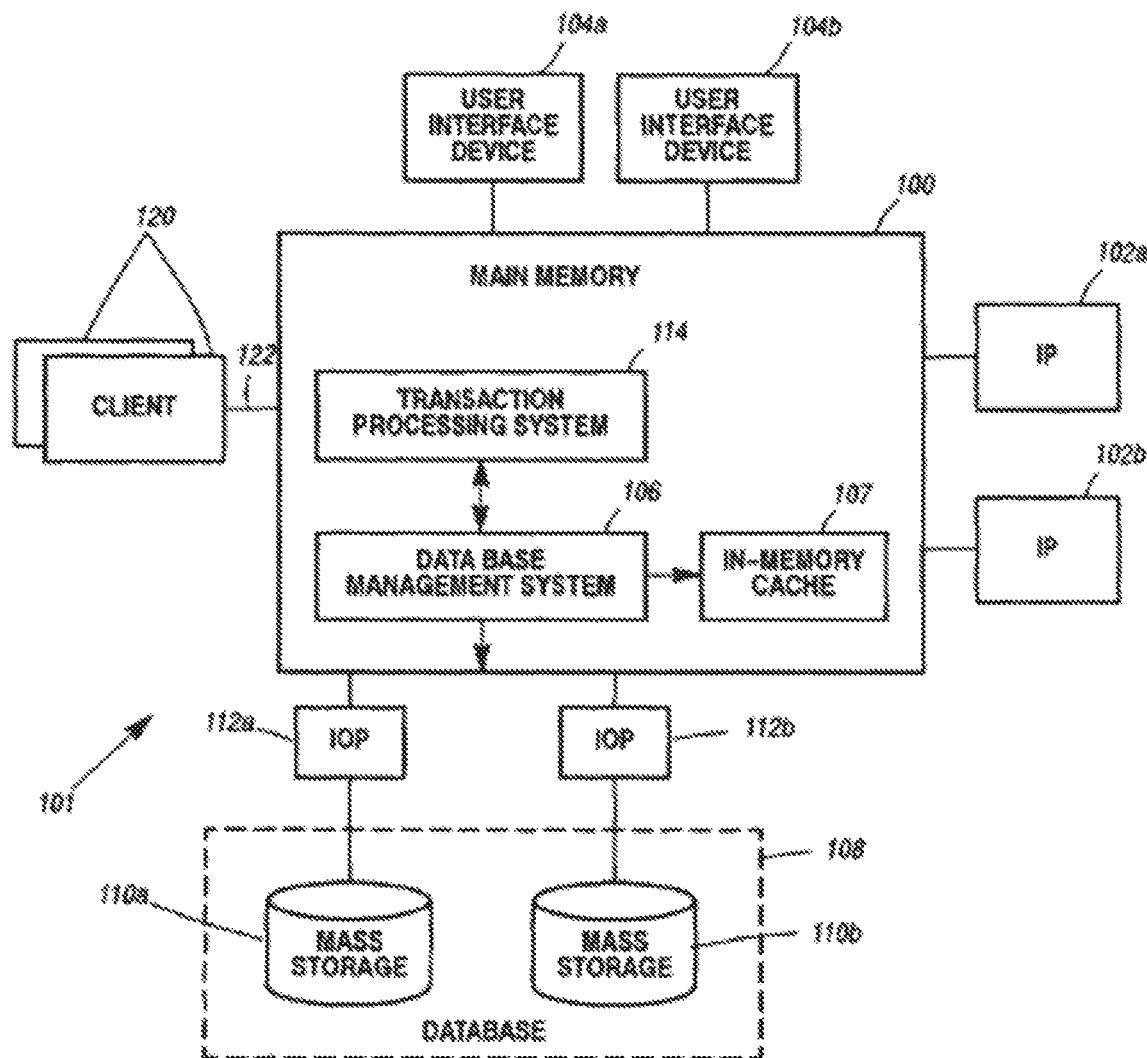
FIG. 1 is a block diagram of an exemplary data processing system that may usefully employ the current invention.

FIG. 1 is a block diagram of an exemplary data processing system 101 that may usefully employ the current invention. The data processing system may be a personal computer, a workstation, a legacy-type system, or any other type of data processing system known in the art. The system includes a main memory 100 that is interactively coupled to one or more Instruction Processors (IPs) 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A Database Management System (DBMS) 106 is loaded into main memory 100. This DBMS, which may be any DBMS known in the art, manages, and provides access to, a database 108 (shown dashed). The database may be stored on one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for storing multiple copies of the same data redundantly on multiple hard disks to improve efficient retrieval of the data, and to increase fault tolerance. Battery back-up may be provided, if desired. The transfer of data between mass storage devices and DBMS is performed by Input/Output Processors (IOPs) 112a and 112b.

The DBMS 106 may be a relational database management system (RDBMS). Data records are related to a table. Data records exist in a database file and may also exist in memory in a database cache. The underlying database file is divided logically into pages. Each page may contain several database records. The basic unit of a RDBMS file management is a page, which is read into cache and written from cache to the underlying file. The contents of each data record is defined by a corresponding definition in the system catalog and in the system catalog's corresponding in-memory catalog data structure. Preferably, the system catalog is implemented as a table in the database. Modifications to the system catalog are handled like modifications to any table. Once system catalog modifications are made permanent (committed to the database), the in-memory catalog data structures can be modified to match the updated system catalog in the database.

A transaction processing system 114 may be coupled to DBMS 106. This transaction processing system receives queries for data stored within database 108 from one or more users. Transaction processing system formats these queries, then passes them to DBMS 106 for processing. DBMS 106 processes the queries by retrieving data records from, and storing data records to, the database 108. The DBMS 106 provides a locking mechanism to keep multiple users from making conflicting updates to the database. A lock can be applied to a database page or to a record on the page. A lock can be local (for this host only) or global (applies across all hosts in a multi-host or clustered environment). A global lock informs the other hosts that their copy of the locked page is out of date. The other host will acquire an updated copy of the page the next time it is needed. Techniques other than locking can be used to keep the cache copy of a page consistent between hosts. For example, the one host may be considered the host-of-record or page-owner, which other hosts that want to update the page must contact before updating the page.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

It will be appreciated that the system of FIG. 1 is merely exemplary, and many other types of configurations may usefully employ the current invention to be described in reference to the remaining drawings.

Figure 2:
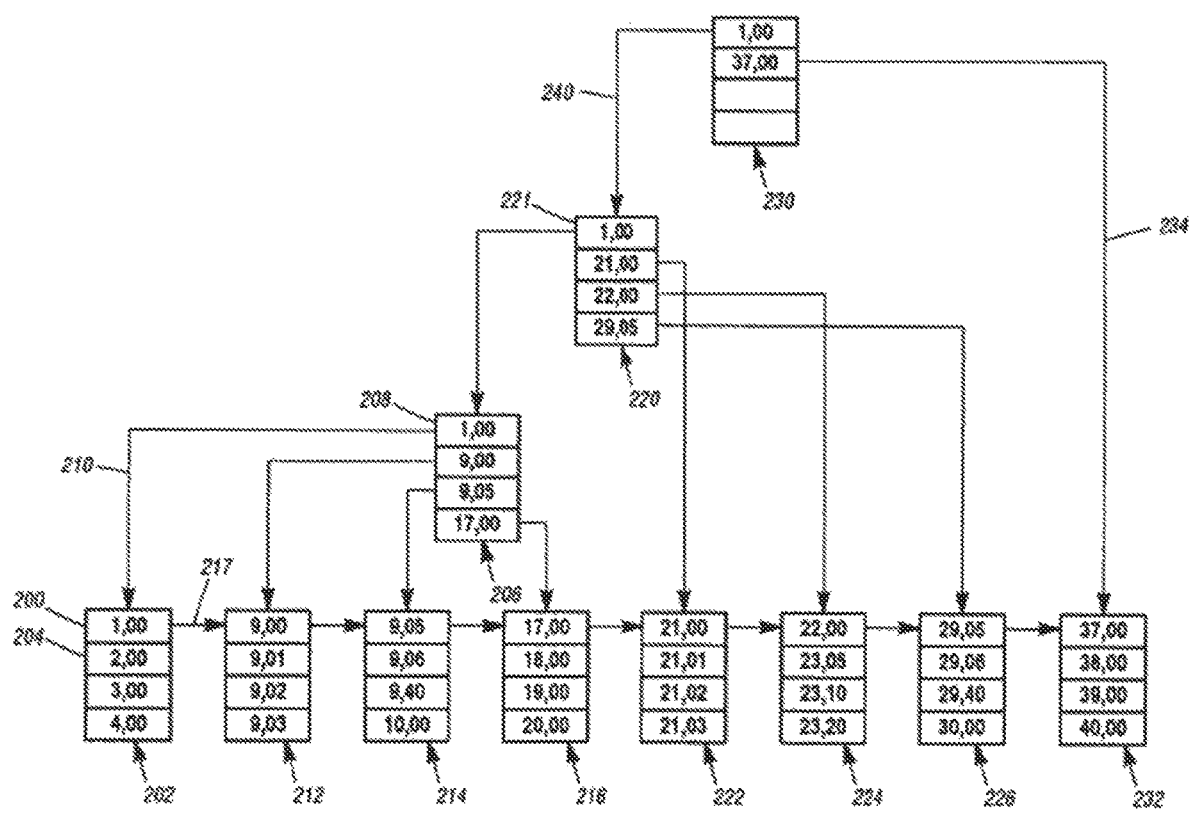
FIG. 2 is an example of a B+-tree constructed from sorted records using a prior method.

FIG. 2 is an example of a B+-tree constructed from sorted records. According to the method of FIG. 2, a stream of records is received such that a known relationship exists between the index values of sequentially received records. In the illustrated example, the stream of records is sorted so that the index values appear in ascending order.

The first received record 200 has an index value of "1.00". This record is stored in a leaf node that is allocated on page 202 of storage space. In this example, the page stores up to four records. In practice, each page may store an arbitrarily large number of records that is dictated by page size. The next received record 204 has an index value of "2.00", and is also stored on page 202. Since the records are in a sorted stream, there is no need to reserve space to insert any records between this and the previously received record, so the records may be stored contiguously on the page. Two more records are received before the page is filled.

After page 202 is filled, the first non-leaf node may be created and is allocated another page 206 of storage space. The first entry 208 on page 206 includes the index value "1.00" of the first record on page 202. In another embodiment, this entry might include the last index value "4.00" that appears on page 202. In still another embodiment, this entry may contain both index values "1.00" and "4.00". Entry 208 further stores a pointer to page 202, represented by pointer 210. This pointer may be an address, an offset, or any other type of indicia that uniquely identifies page 202. In a preferred embodiment, the pointer will provide information allowing for efficient retrieval of page 202. After page 206 has been created, processing continues by creating leaf nodes on pages 212, 214, and 216, each of which is pointed to by an entry on page 206.

According to one embodiment, the leaf nodes of the tree of FIG. 2 may each store a pointer to a leaf node that is ordered next in the sort order based on the index values. For example, leaf node to the next without requiring traversal of the tree hierarchy. This makes the search more efficient.

After the fourth (last) entry is created on page 206, another non-leaf node is created on newly allocated page 220. This new node includes an entry 221 that points to page 206, and that stores an index value from the first entry of page 206. In another embodiment, the first entry on page 220 could store the index value from the last entry of page 206. Creation of leaf nodes may then continue with the creation of additional leaf nodes on pages 222, 224, and 226. Corresponding entries are created on page 220.

The foregoing process continues when page 220 is full. That is, page 230 is allocated to store another non-leaf node that points to page 220, and that further points to leaf nodes such as node 232.

As can be appreciated from FIG. 2, the method results in a tree that becomes increasingly unbalanced as more records are stored within the tree. This is evident from the fact that three levels of hierarchy separate pages 202 and 230, but only a single level of hierarchy separates page 230 from page 232. As a result, when the tree is being search for a particular record, search times will vary widely depending on when the record happened to be added to the tree during the creation process.

To address the foregoing problem, the tree of FIG. 2 can be "balanced" after it is created so that each leaf node is approximately the same distance from the root as all other nodes. For example, in the tree of FIG. 2, balancing could occur by re-directing pointer 240 of page 230 to point to page 206 rather than page 220. Page 220 is then inserted between pages 206 and 232. This is accomplished by deleting entry 221 of page 220, re-directing pointer 234 of page 230 to point to page 220 instead of page 232. Finally, an entry is created in page 220 pointing to page 232.

While the above-described re-balancing process appears quite simple, this process becomes increasingly complex as additional hierarchical levels are added to the tree. As a result, re-balancing of a tree can be quite time consuming. In addition, in some instance, the balancing process involves splitting pages and shifting the contents of leaf index pages and non-leaf index pages. This process is even more time-consuming.

It is important to minimize the time required to construct and, if necessary, re-balance, a database. This is particularly true because database tables cannot be accessed at certain times while they are being constructed or re-balanced. For example, while the tree of FIG. 2 is being built, users are not allowed to store data to, or retrieve data from, the database at the points where new pages are created and linked into the tree. If the construction and re-balancing process requires a large amount of time, an unacceptable delay may transpire before a user can gain access to critical data.

Figure 3:
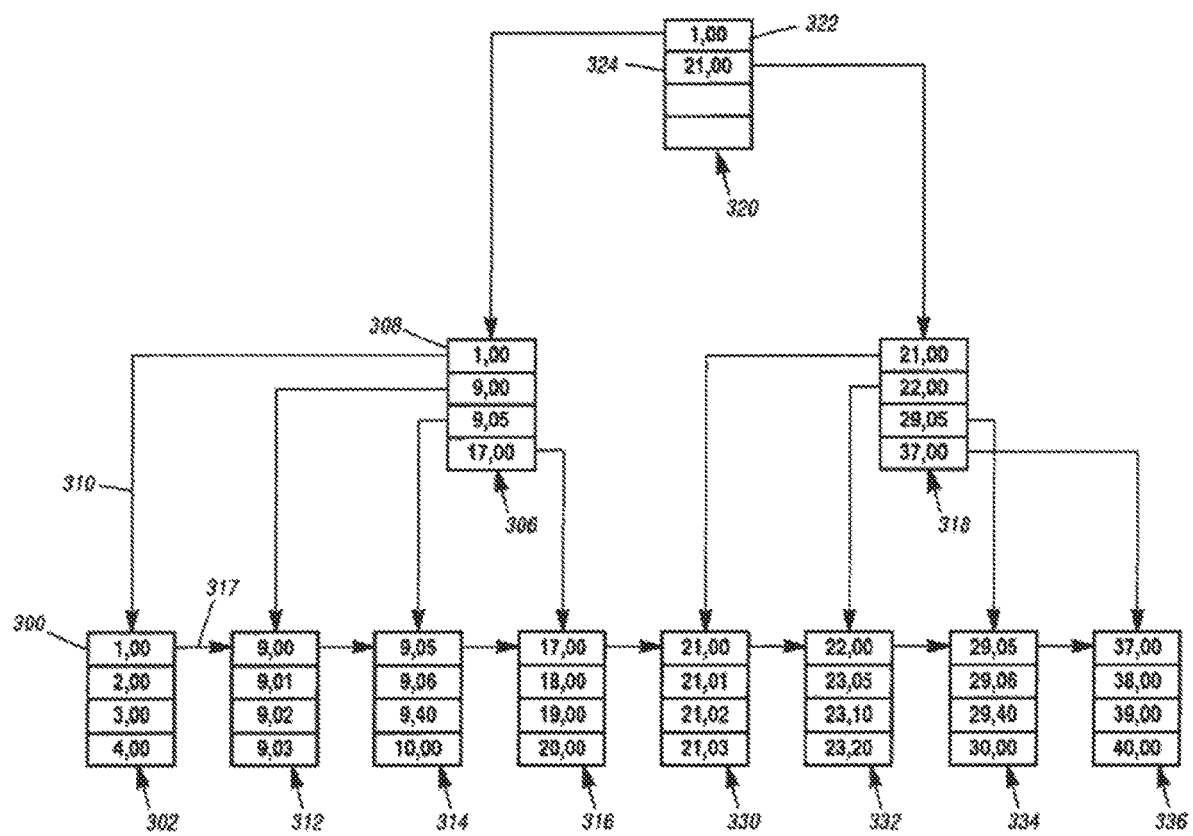
FIG. 3 is another example of a B+ tree construction from sorted records, according to one embodiment.

FIG. 3 is a diagram illustrating one embodiment of a method for use in building a database table. This table is a B+ tree structure. The first received record 300 is stored in a leaf node created on page 302. When four records have been stored on this page so that the page is considered full, the first non-leaf node is created on page 306. The first entry 308 on this page points to page 302, and stores the index value "1.00" of the first record on page 302. In another embodiment, this entry might include the index value "4.00" obtained from the last entry on page 302. In another embodiment, this entry may include both index values "1.00" and "4.00". Entry 308 further stores a pointer 310 to page 302.

After page 302 is created, additional leaf nodes are created on pages 312, 314, and 316, each of which is pointed to by an entry on page 306. According to one embodiment, at least one of the entries on each of these pages 302, 312, 314, and 316 stores a pointer to the node appearing next in the sort order based on the index values. For example, page 302 stores a pointer 317 to page 312, and so on. This allows a search to continue from one leaf node to the next without requiring the traversal of the tree hierarchy. This makes the search more efficient.

After page 306 has been filled, a sibling is created for this page at the same level of the tree hierarchy. This sibling, non-leaf node is shown as page 318. In addition to creating the sibling, a parent node is created pointing to both page 306 and the newly created sibling on page 318. This parent node, which is shown as page 320, includes an entry 322 pointing to, and including the index from, the first record of page 306. Similarly, entry 324 points to, and includes the index from, the first record of page 318.

Next, additional leaf nodes are created on pages 330, 332, 334, and 336 in the foregoing manner. Thereafter, page 318 is full, and another sibling will be created for page 318 which is pointed to by an entry of page 320. In a similar manner, when page 320 is full, both a sibling and a parent are created for page 320 and the process is repeated. This results in a tree structure that is balanced, with the same number of hierarchical levels existing between any leaf node and the root of the tree.

The above-described process stores records within leaf nodes. In an alternative embodiment, the records may be stored in storage space that is pointed to, but not included within, the leaf nodes. This may be desirable in embodiments wherein the records are large records such as Binary Large OBjects (BLOBs) that are too large for the space allocated to a leaf node.

In the above exemplary embodiment, records are sorted according to a single index field. Any available sort mechanism may be used to obtain this sort order prior to the records being added to the database tree. An alternative embodiment may be utilized wherein records are sorted according to other fields such as a primary key value, a secondary index, a clustering index, a non-clustering index, UNIQUE constraints, and etc. as is known in the art. Any field in a database entry may be used for this purpose. Additionally, multiple fields may be used to define the sort order. For example, records may be sorted first with respect to the leading column of the key, with any records having a same leading column value further sorted based on the second leading key value, and so on. Any number of fields may be used to define the sort order in this manner.

When the database tree is constructed in the manner discussed above, it may be constructed within an area of memory such as in-memory cache 107 of main memory 100 (FIG. 1). It may then be stored to mass storage devices such as mass storage devices 110a and 110b.

The mechanism described in reference to FIG. 3 results in the construction of a tree that remains balanced as each leaf node is added to the tree. Thus, no re-balancing is required after tree construction is completed, and no data need be shuffled between various leaf and/or non-leaf nodes. Moreover, if tree construction is interrupted at any point in the process, the resulting tree is balanced.

Figure 4:
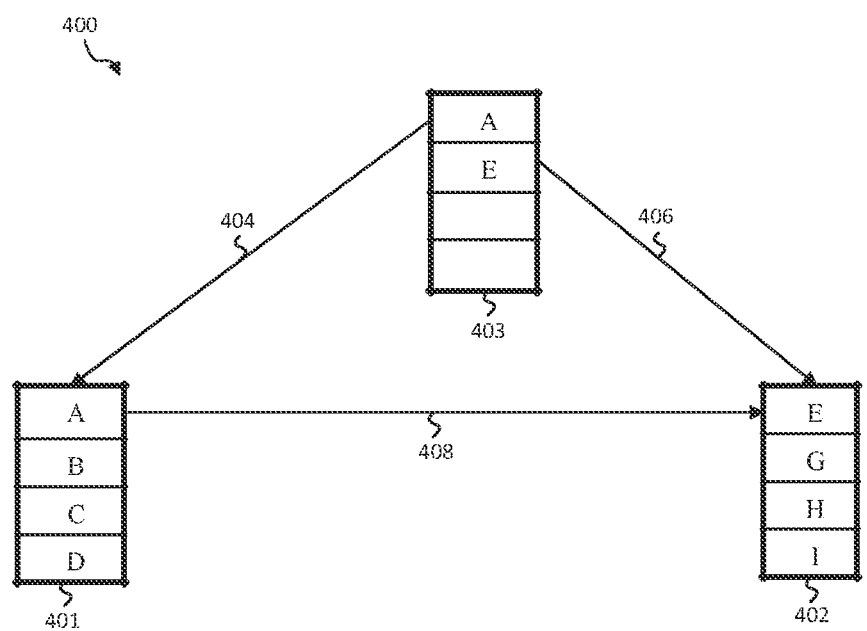
FIG. 4 is another example of a B+ tree construction form sorted records, according to one embodiment.

Referring to FIG. 4, a B+ tree structure 400 is illustrated. Two leaf index pages or nodes are illustrated 401, 402. It is assumed that four data records can fit on a leaf page before it must be split. In this illustration, the non-leaf page 403 of the index keep the lowest record values "A" and "E" of page 401 and page 402, respectfully. As discussed above, the highest record value could be used as well. The non-leaf page 403 also has a pointer 404 to page 401 and a pointer 406 to page 402. Page 401 also has a pointer 408 to page 402.

In a multi-host environment, to graft a scion onto a B+ tree structure, such as that shown in FIG. 4, three rules are used. The first rule is that the DBMS can not prefetch data pages belonging to a graft-enabled B+ tree into cache memory. This means that a page containing data for the B+ tree will not appear in cache memory unless it is currently a part of the B+ tree. In other words, it has already been grafted into the tree. The second rule is that the scion must logically be appended onto the understock B+ tree and not in the middle of the understock B+ tree. The third rule is to effect the graft, the understock root page must be made to point to the scion root page. And, the right page link must be made from the right-most page in the understock B+ tree to the left-most page of the scion B+ tree.

Figure 5:
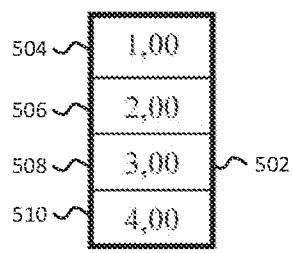
FIG. 5 is a diagram illustrating a leaf page with data records, according to one example embodiment.

Referring to FIG. 5, a leaf index page 502 is shown having four records 504, 506, 508, 510. The first record 504 has a value of "1.00". The second record 506 has a value of "2.00". The third record 508 has a value of "3.00". And, the fourth record 510 has a value of "4.00". The leaf page 502 is full (under the above assumption that four records fit on a page). In order to add more records, additional pages are required.

Figure 6:
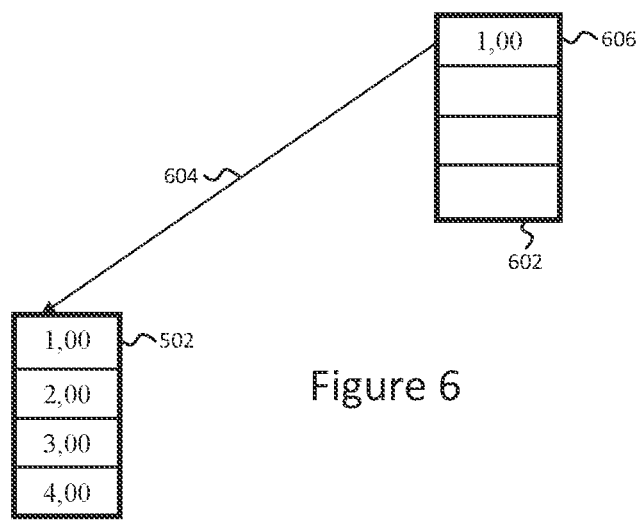
FIG. 6 is a diagram illustrating the leaf page with a parent non-leaf page, according to one example embodiment.
Figure 7:
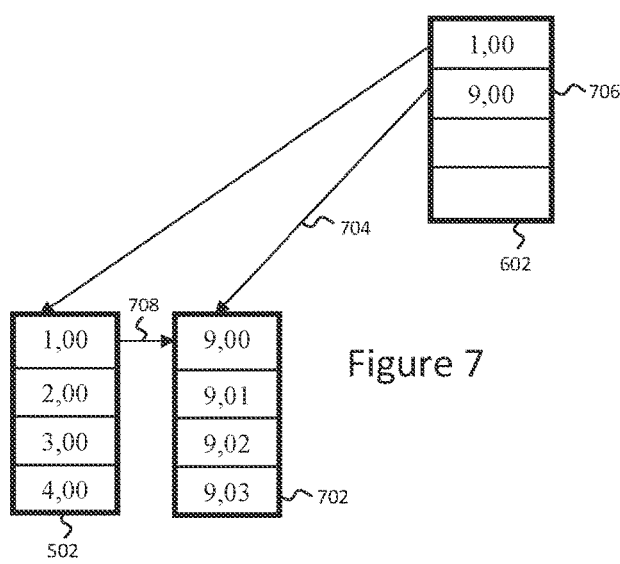
FIG. 7 is a diagram illustrating two leaf pages with a parent non-leaf page, according to one example embodiment.
Figure 8:
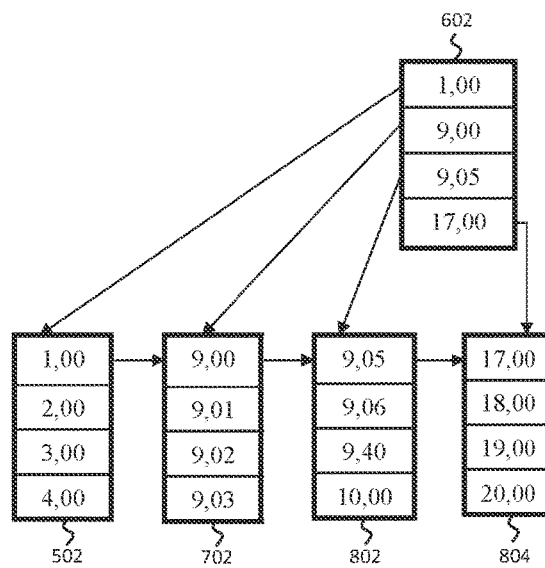
FIG. 8 is a diagram illustrating four leaf pages with a parent non-leaf page, according to one example embodiment.

Referring to FIGS. 6-8, additional pages are created. In FIG. 6, a non-leaf page 602 is created. A pointer 604 points to the leaf page 502 of FIG. 5. The first record 606 of the non-leaf page 602 includes the lowest value "1.00" of page 502. In FIG. 7, a new leaf page 702 is created. Page 602 is updated with a pointer 704 to new page 702 and the second record 706 of the page 602 is updated with the lowest value "9.00" of page 702. Page 502 is also updated with a pointer 708 to page 702. This allows searching to be performed at the leaf node level without traversing to a higher level in the tree. In another embodiment, the links at the leaf node level may be omitted. In FIG. 8, additional leaf pages 802 and 804 are likewise created and linked. And, page 602 is likewise updated to reflect the additional pages 802 and 804 and discussed above. The non-leaf pages 502, 702, 802, 804 are full, each containing four records. Likewise, the non-leaf page 602 if full having information and pointers for the four non-leaf pages 502, 702, 802, 804. In order to add additional records, new pages are needed.

Figure 9:
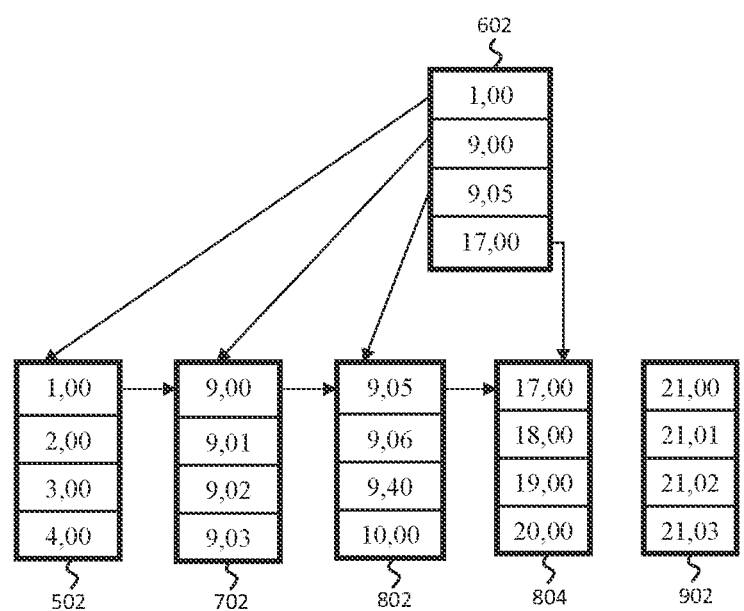
FIG. 9 is a diagram illustrating the leaf pages with a parent non-leaf page, according to one example embodiment.
Figure 10:
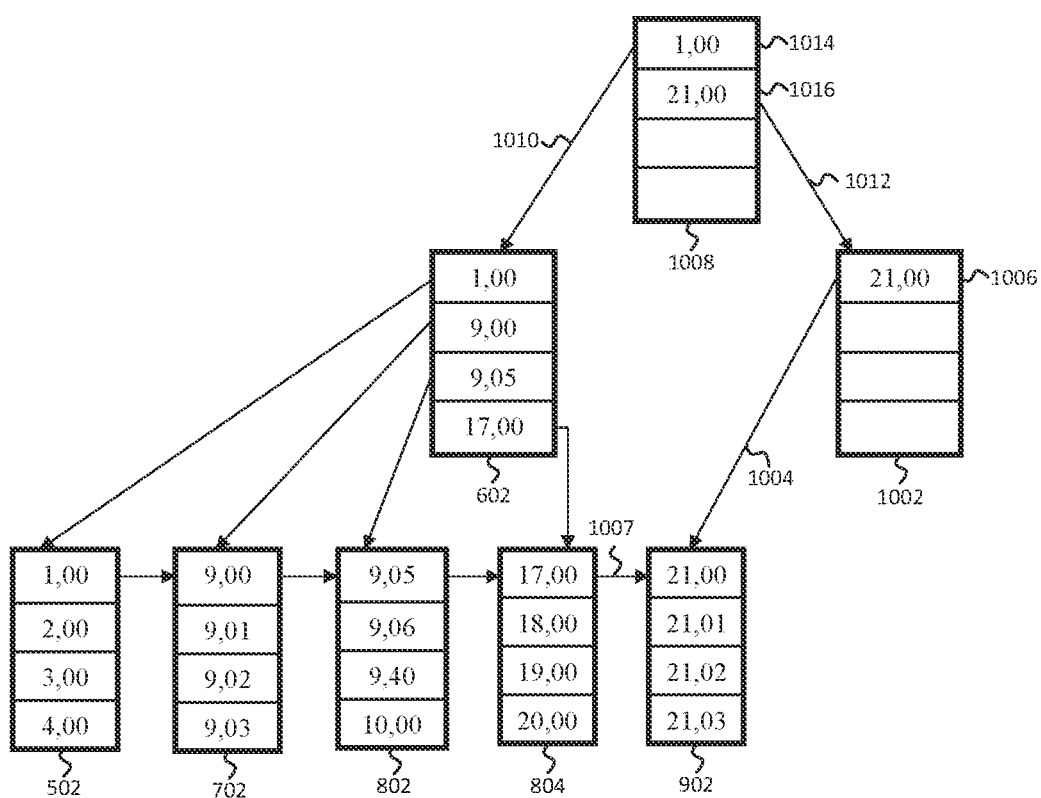
FIG. 10 is a diagram illustrating a B+ tree structure, according to one example embodiment.

In FIG. 9, a new leaf page 902 is created but the non-leaf page 602 is full with records/pointers to pages 502, 602, 802 and 804. Therefore, in FIG. 10, a new non-leaf page 1002 is created with a pointer 1004 to page 902. The first record 1006 of page 1002 is updated with the lowest value "21.00" of page 902. A pointer 1007 is added from page 804 to page 904. Another new non-leaf page 1008 is created above pages 602 and 1002. Pointers 1010, 1012 are created to pages 602 and 1002, respectively. The first record 1014 of page 1008 is updated with the lowest value "1.00" of page 602 and the second record 1016 is updated with the lowest value "21.00" of page 1002. In FIG. 10, non-leaf page 1008 is the root page of the B+ tree structure shown. And, leaf page 902 is the right-most leaf page of the B+ tree structure.

Figure 11:
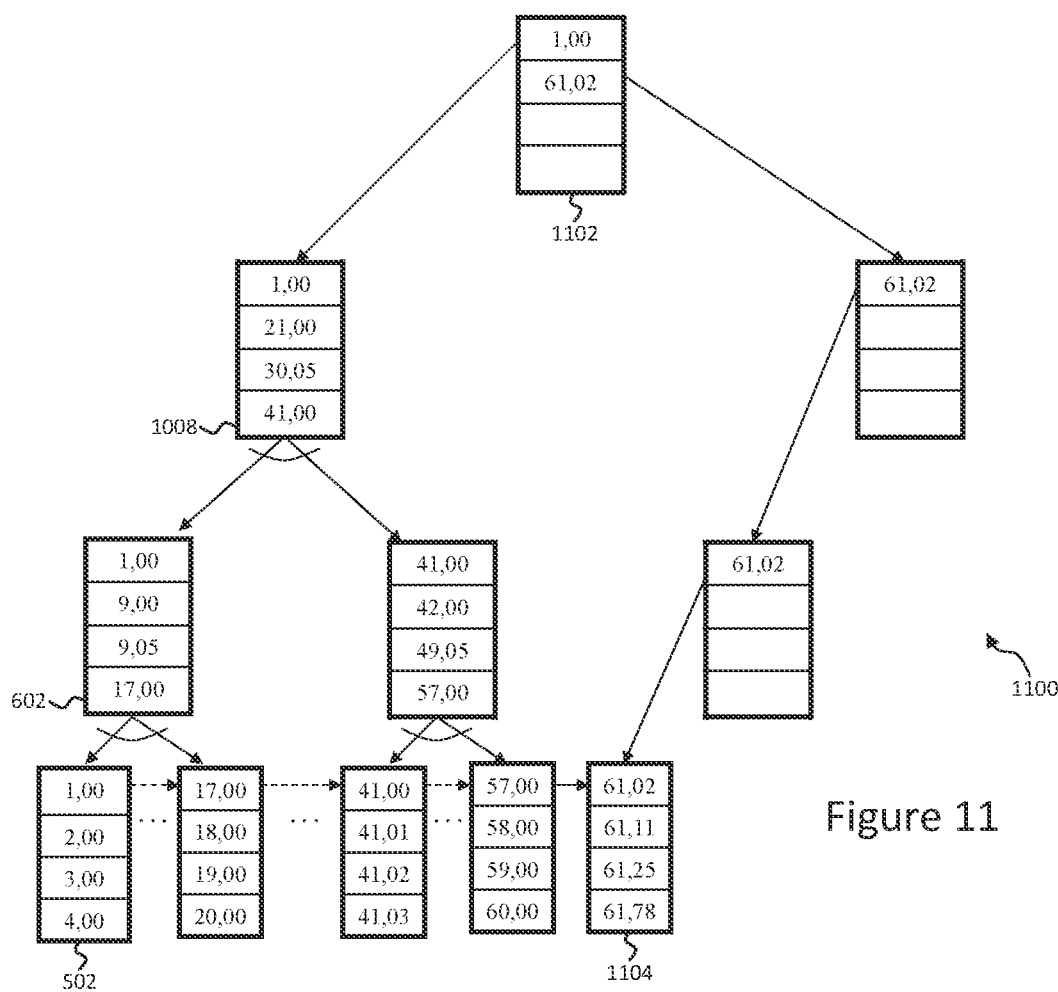
FIG. 11 is a diagram illustrating a B+ tree structure, according to one example embodiment.

Referring to FIG. 11, additional pages are added to the B+ tree structure 1100 ending with UNDERSTOCKROOT 1102 (the root page of the understock tree). The right-most leaf page of the understock tree is leaf page 1104, also known as UNDERSTOCKRIGHT 1104. The process of creating the B+ tree shown occurs in a manner similar to that discussed above. A stream of records is received. These records are sorted such that a known relationship exists between the index values of consecutively received records. The records may be stored within tree such that a balanced tree is constructed without the need to perform any re-balancing after tree creation has been completed. Users may then be granted access to the data stored within the tree.

Figure 12:
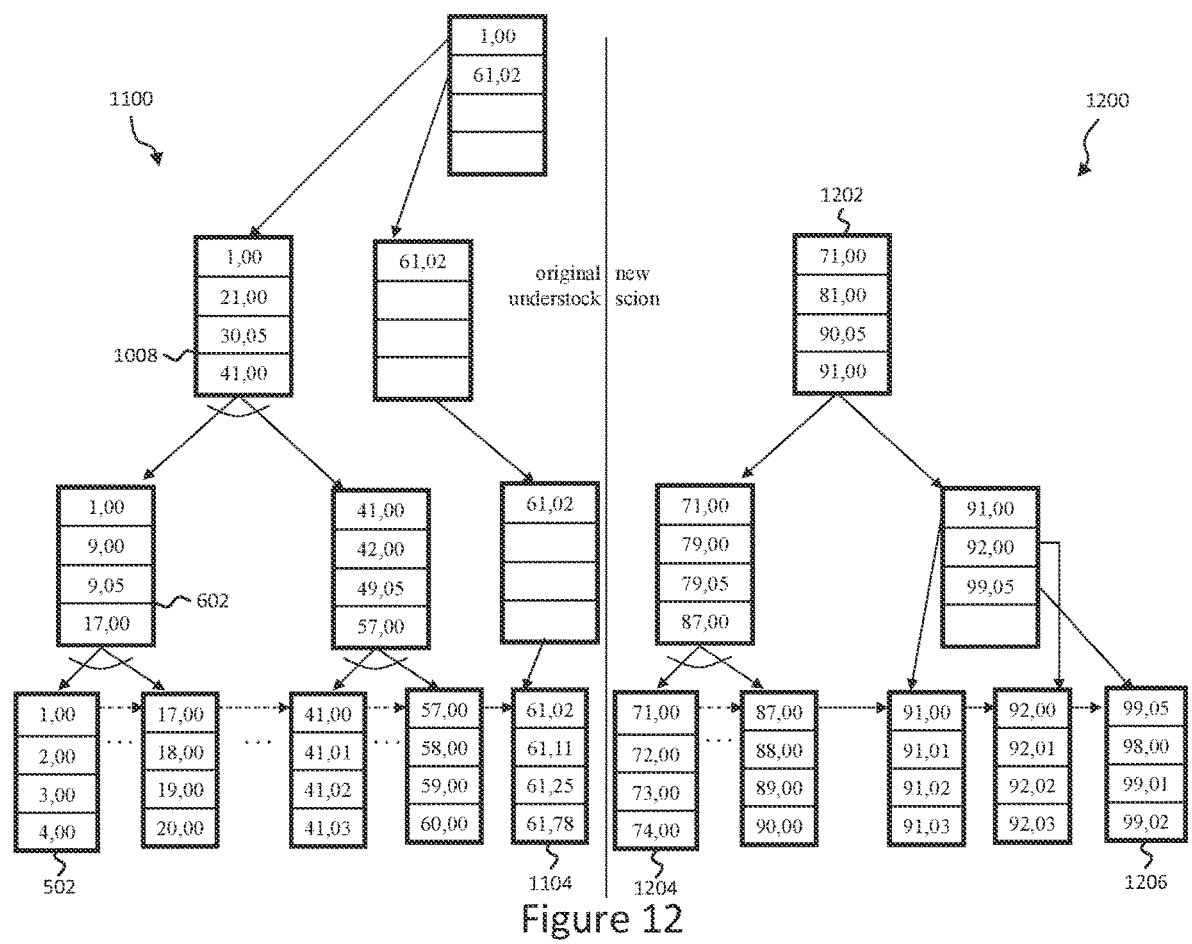
FIG. 12 is a diagram illustrating an example sub-tree to be grafted onto a tree, according to one example embodiment.

In FIG. 12 a scion B+ tree structure 1200 is to be grafted to the understock B+ tree structure 1100 of FIG. 11. The scion 1200 has a root page 1202, i.e. SCIONROOT 1202. The scion 1200 was created outside of the DBMS to be appended onto the understock tree 1100. SCIONLEFT 1204 is its left-most leaf data page and SCIONRIGHT 1206 is its rightmost leaf data page of the scion 1200. The understock B+ tree 1100 is the B+ tree to which the scion 1200 is to be grafted. UNDERSTOCKROOT 1102 is the root page of the understock tree 1100. UNDERSTOCKRIGHT 1104 is the right-most data leaf page of the understock tree 1100.

The UNDERSTOCKROOT 1102 is locked to prevent concurrent updates. A search is performed to find SCION-LEFT 1204 of the scion 1200. From SCIONROOT 1202, the smallest value "71.00" of the records in the scion 1200 is known. A search of the understock tree 1100 is performed to find the position where the first record of the scion 1200 should be inserted. A lock is placed on this page, UNDERSTOCKRIGHT 1104. If the insert point is not UNDERSTOCKRIGHT 1104, the scion 1200 violates the second rule, and an error message is issued. Any processing is rolled back because the scion is not being appended, but is instead being inserted into the middle of the understock B+ tree. In this situation, the scion is added to the B+ tree using a traditional insert or update method from prior art. In the example shown in FIG. 12, the smallest value "71.00" is greater than the largest value of UNDERSTOCKRIGHT 1104 "61.78", so the second rule is not violated and the scion 1200 can be appended or grafted to the understock tree 1100. It is noted that only pages 1102 and 1104 are locked. These are the only two pages of the understock tree 1100 that need to be updated. Thus, searches can be performed on the remaining nodes or pages as long as the search does not require access to pages 1102 or 1104.

Next UNDERSTOCKRIGHT 1104 is read into cache memory. Some or all of the understock tree 1100 may be retained in an in-memory cache, which is an area within the main memory allocated to storing portions of the database table. The sub-tree may also be constructed, and grafted to the tree, within the in-memory cache. The nodes of the tree and sub-tree that are retained within the in-memory cache may be accessed more quickly than if these nodes had to be retrieved from mass storage devices. Therefore, the grafting process may be completed more quickly if the nodes involved in the grafting are stored in the in-memory cache.

Figure 13:
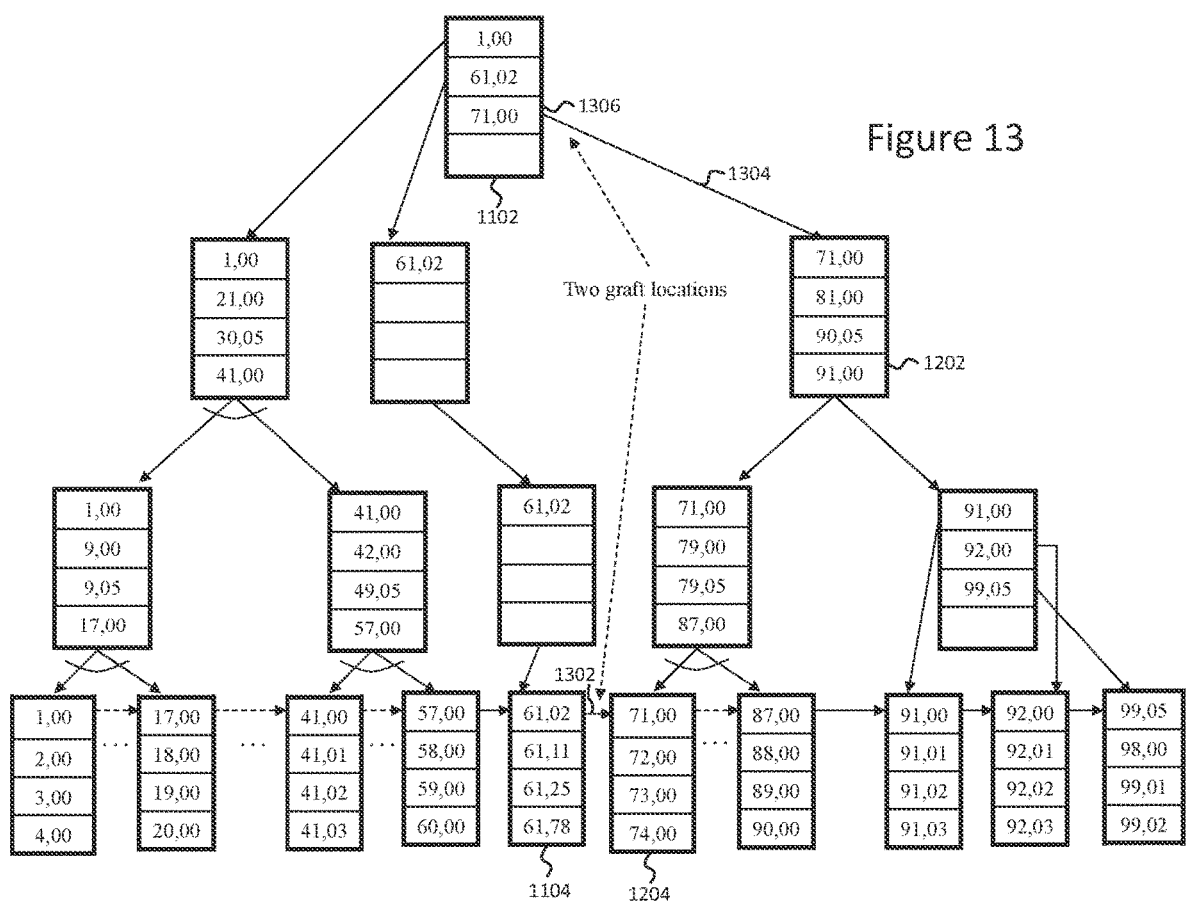
FIG. 13 is a diagram illustrating the example sub-tree grafted onto the tree, according to one example embodiment.

Referring to FIG. 13, the UNDERSTOCKRIGHT 1104 is updated to include a pointer 1302 to SCIONLEFT 1204 (the left-most leaf page of the scion 1200). UNDERSTOCKROOT 1102 is read into cache memory. UNDERSTOCKROOT 1102 is updated to include a pointer 1304 to SCIONROOT 1202. The third record 1306 of UNDERSTOCKROOT 1102 is written to include the lowest value "71.00" of the SCIONROOT 1202. The transaction is committed, which causes UNDERSTOCKROOT 1102 and UNDERSTOCKRIGHT 1104 to be written to the database file. The locks are then released and the scion 1200 is now part of the B+ tree structure 1100 in a single B+ tree.

A potential concurrency problem in a single host case is a small window during which the UNDERSTOCKROOT 1102 is being updated. During this window, no B+ searches beginning at the root 1102 may start. However, non-indexed searches can start. In addition, searches that have already passed the root 1102 may continue. This includes range searches, where many sequential records are scanned and the next page of records to be scanned is located using the current pages right link. Such searches can take seconds, minutes or even hours.

Figure 14:
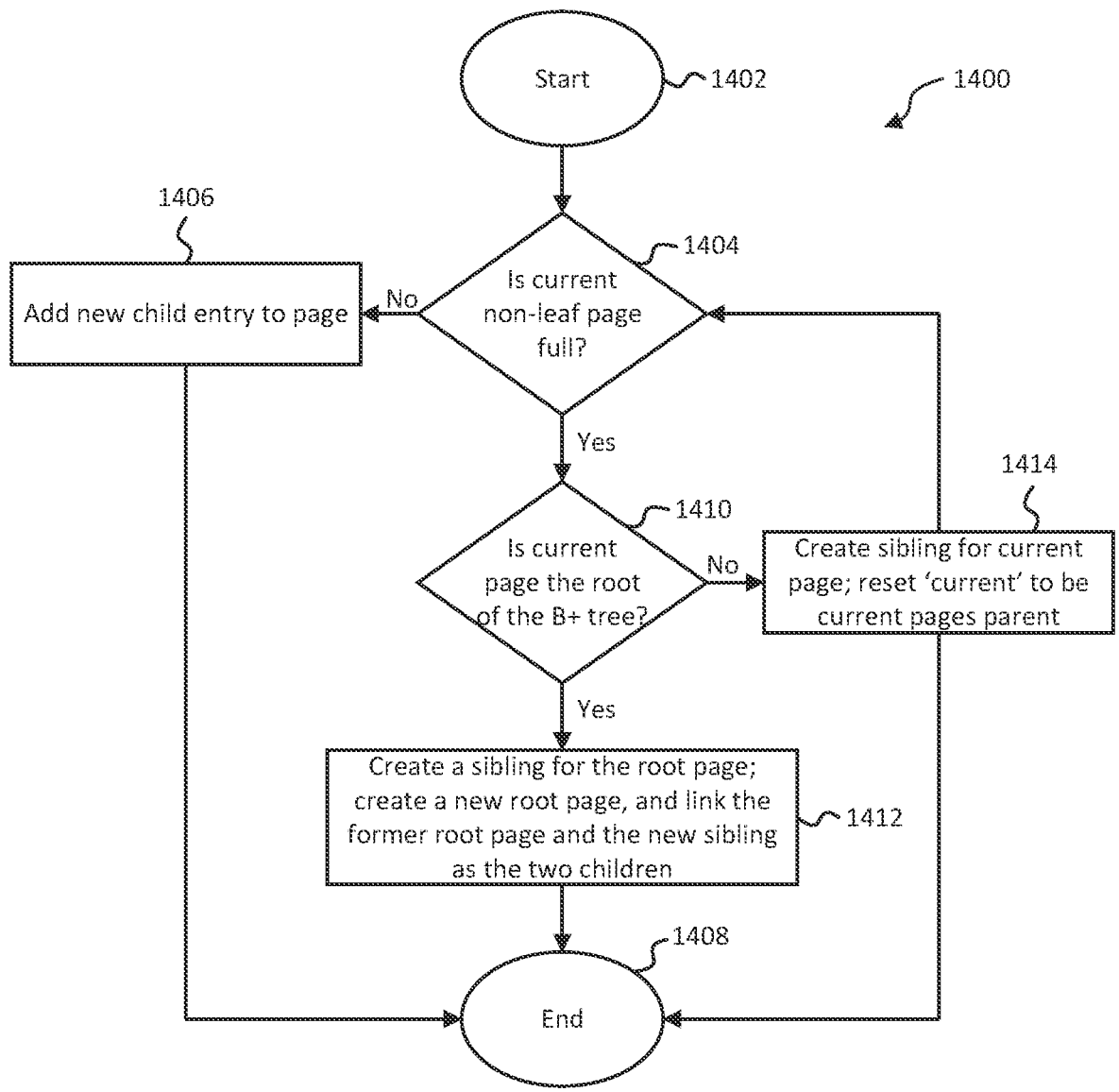
FIG. 14 is a flow diagram illustrating a generalized embodiment of the grafting process that creates a balanced tree structure, according to one example embodiment.

Referring to FIG. 14, a method 1400 of building a B+ tree structure is illustrated. Flow begins at 1402. At 1404, it is determined if the current non-leaf page is full. If it is determined the current non-leaf page is not full, flow branches "NO" to 1406 and a new child entry to the page is written. Flow ends at 1408. A 1404, if it is determined the current non-leaf page is full, flow branches "YES" to 1410. At 1410, it is determined if the current page is the root page of the B+ tree. If it is determined, the current page is the root page, flow branches "YES" to 1412. At 1412, a sibling page and a new root page are created. The former root page becomes a child of the new root page and a sibling to the sibling page. Flow ends at 1408. At 1410, if it is determined the current page is not the root page, flow branches "NO" to 1414. At 1414, a sibling is created for the current page and the parent page is updated accordingly. Flow continues to 1408.

The foregoing method builds a database tree from the "bottom up" rather than from the "top down". The process results in a balanced tree that does not require re-balancing after its initial creation. As a result, users are able to gain access to the tree far more quickly than would otherwise be the case if the tree were constructed, then re-balanced. Moreover, the balanced tree ensures that all nodes are the about same distance from the root so that a search for one record will require substantially the same amount of time as a search for any other record.

According to another aspect of the invention, database records may be added to an existing tree structure in a manner that allows a new sub-tree to be created, then grafted into the existing tree. After a tree is created using a portion of the records included within a sorted stream of records, users are allowed to access the tree. In the meantime, a sub-tree structure is created using a continuation of the original record stream. After the sub-tree is created, the pages to which the graft occurs within the tree are temporarily locked such that users are not allowed to reference these pages. Then the sub-tree is grafted to the tree, and the pages within the tree are unlocked. Users are allowed to access the records within the tree and sub-tree. This process, which may be repeated any number of times, allows users to gain access to records more quickly than if all records must be added to a tree before any of the records can be accessed by users. In another embodiment, access to parts of the tree may be controlled using locks on individual records rather than locks on pages.

Figure 15:
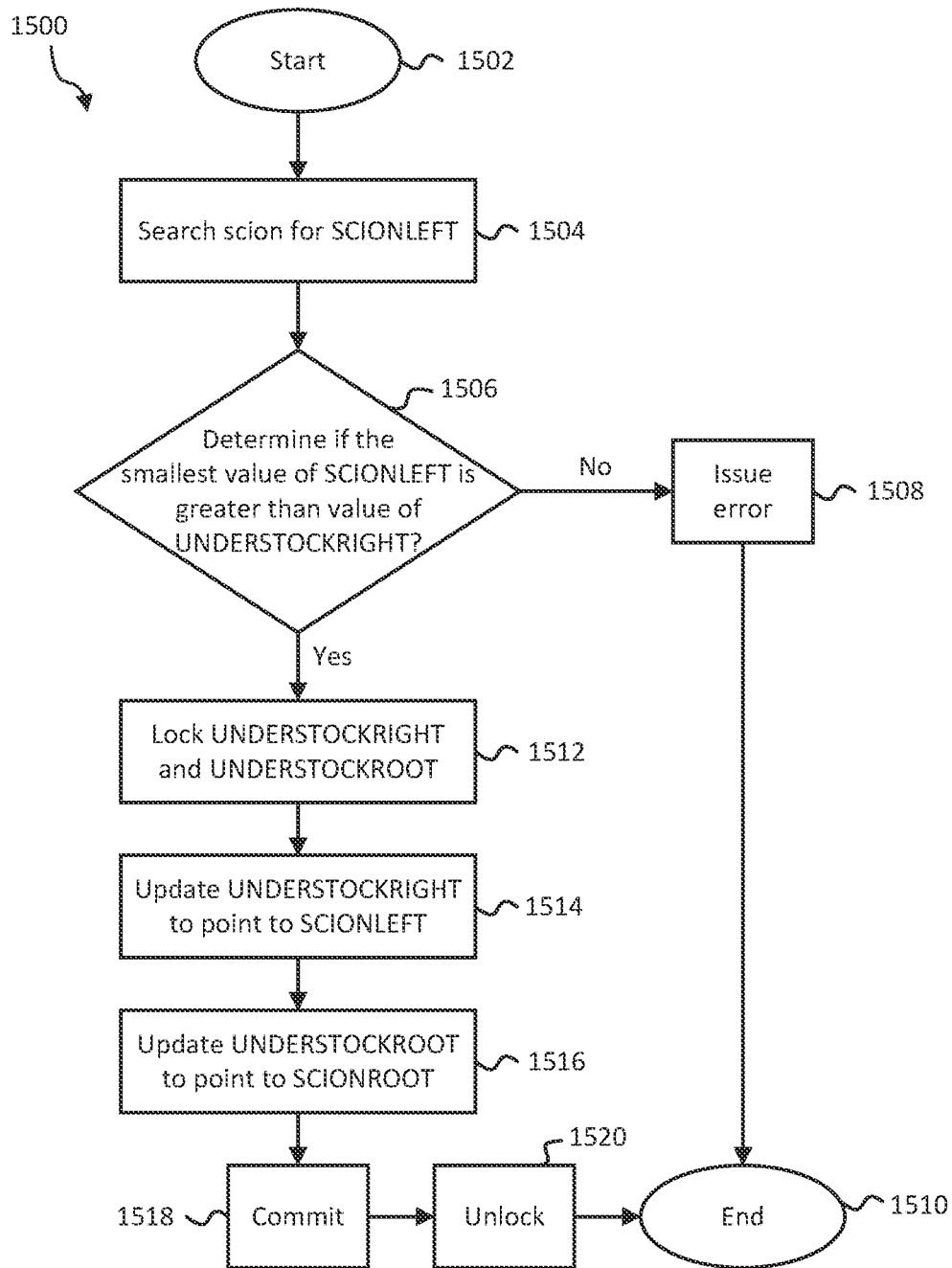
FIG. 15 is a flow diagram illustrating a generalized embodiment of the grafting process that creates a balanced tree structure, according to one example embodiment.

Referring to FIG. 15, a method 1500 of grafting a scion onto an understock B+ tree, fore example the scion 1200 and understock B+ tree 1100 of FIG. 12, is illustrated. Flow begins at 1502. At 1504, the scion is searched for SCIONLEFT (i.e. the left-most leaf data page of the scion). At 1506, it is determined if the smallest value of SCIONLEFT is greater than a value of UNDERSTOCKRIGHT (i.e. the right-most leaf data page of the understock tree). If it is determined the smallest value is not greater, flow branches "NO" to 1508. At 1508, an error is issued and flow ends at 1510. At 1506, if it is determined the smallest value is greater, then flow branches "YES" to 1512. At 1512, UNDERSTOCKRIGHT and UNDERSTOCKROOT (i.e. the root page of the understock tree) are locked. The locks prevent access to the pages during updating. At 1514, UNDERSTOCKRIGHT is updated to point to SCIONLEFT. At 1516, UNDERSTOCK ROOT is updated to point to SCIONROOT (i.e. the root page of the scion). At 1518, the updates are committed. At 1520, the locks are released and flow ends at 1510.

Figure 16:
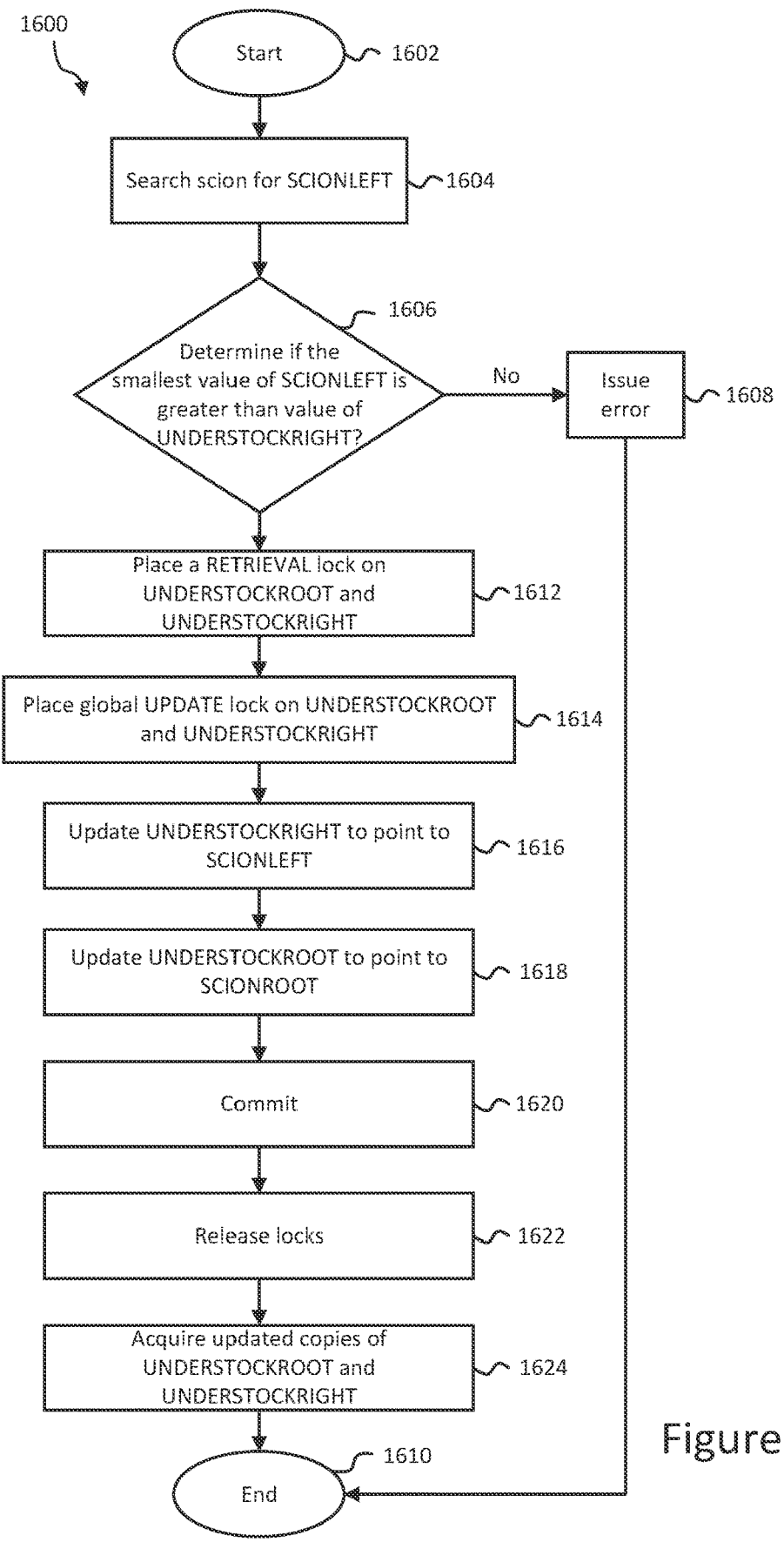
FIG. 16 is a flow diagram illustrating a generalized embodiment of the grafting process that creates a balanced tree structure in a multi-host environment, according to one example embodiment.

Referring to FIG. 16, a method 1600 of grafting a scion onto an understock B+ tree in a multi-host system is illustrated. Flow begins at 1602. At 1604, the scion is searched for SCIONLEFT. At 1606, it is determined if the smallest value of SCIONLEFT is greater than a value of UNDERSTOCKRIGHT. If it is determined the smallest value is not greater, flow branches "NO" to 1608. At 1608, an error is issued and flow ends at 1610. At 1606, if it is determined the smallest value is greater, then flow branches "YES" to 1612. At 1612, a RETRIEVAL lock is placed on UNDERSTOCKRIGHT and UNDERSTOCKROOT. At 1614, a global UPDATE lock is placed on UNDERSTOCKRIGHT and UNDERSTOCKROOT and they are read into cache. At 1616, UNDERSTOCKRIGHT is updated to point to SCIONLEFT. At 1618, UNDERSTOCKROOT is updated to point to SCIONROOT. At 1620, the updates are committed. At 1622, the locks are released. At 1624, the other hosts acquire updated copies of UNDERSTOCKRIGHT and UNDERSTOCK ROOT either immediately or next time they are needed, depending on implementation. Flow ends at 1610.

The potential multi-host concurrency problem is the same as for the single host case. The UPDATE lock protects against another run reading meta-information (such as the number of records on the page) from the page while it is in an inconsistent state. It also protects against another run reading records from the scion before the graft is committed. When the other run is on a different host from that of the update, it will not have trouble with the pages meta-information because its copy of the page is consistent. The other host can therefore read-through the UPDATE lock and perform a search of the B+ tree as long as that search does not traverse any right-most page such as UNDERSTOCKRIGHT.

The present invention of grafting a scion is unique. Previously only entire partitions could be added to tables. A quiescent point, with respect to table access is required to add the partition. A quiescent point cannot happen very often because range searches take seconds, minutes or hours. Concurrent range searches may have overlapping completion times. To force a quiescent point requires a wait of hours for currently running queries to complete and a stop to all new queries. The current invention does not require range searches to be terminated, nor does it require a container per scion. Thus, the time between when the records arrive at the computer system and time when they are available for access within the database is greatly reduced. In addition, because the solution works in a multi-host database, the maximum database size and transaction rate that can be handled by tables updated in this fashion is increased.

The process of building trees incrementally using the foregoing grafting process allows users to access data within the records of the database much more quickly than would otherwise be the case if all records were added to a database tree prior to allowing users to access the data. This is because users are allowed to access records within the tree while a sub-tree is being constructed. After the sub-tree is completed, users are only temporarily denied access to some of the records within the tree while the grafting process is underway, and are thereafter allowed to access records of both the tree and sub-tree. The grafting process may be repeated any number of times. If desired, all sub-trees may be constructed in increments that include the same predetermined number of records, and hence the same number of hierarchical levels. This simplifies the process, since grafting will always occur the same way, with the sub-tree always being grafted into a predetermined level of the tree hierarchical structure, or vice versa. In another embodiment, sub-trees may be built according to predetermined time increments. That is, a sub-tree will contain as many records as are added to the sub-tree within a predetermined period of time. After the time period expires, the sub-tree is grafted to an existing tree or vice versa, and the process is repeated.

The grafting process discussed above generates a tree by adding sub-trees from the left to the right. In another embodiment, sub-trees may be grafted to the left-hand edge of the tree. It may further be noted that the exemplary embodiment provides records that are sorted such that each record has an index, key, or other value that is greater than, or equal to, that of the preceding record. This need not be the case, however. If desired, records may be sorted such that the values stored within the search fields are in decreasing order.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. A serverless environment, such as the cloud, could also be used.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. A serverless environment, such as the cloud, could also be used.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A processor-based method of building and appending data structures in a multi-host environment, comprising:
   creating and storing data into a first data structure having a first root node, a first right leaf node and a plurality of other leaf nodes and non-leaf nodes defining multiple hierarchical levels;
   allowing a search of the first data structure to proceed while creating a second data structure that includes a second root node, a second left leaf node and a plurality of leaf nodes and non-leaf nodes defining multiple hierarchical levels;
   receiving a command to append the second data structure to the first data structure during searching the first data structure;
   identifying the second left leaf node;
   determining that the smallest value of the second left leaf node is greater than a largest value of the first right leaf node;
   creating a lock for all hosts in the multi-host environment to the first root node and the first right leaf node of the first data structure while allowing access to the plurality of other leaf nodes and non-leaf nodes of the first data structure;
   loading the first root node and the first right leaf node into memory;
   updating the first root node and the first right leaf node with information about the second data structure, wherein the second data structure is appended to the first data structure by updating the first root node with at least information about the second root node and updating the first right leaf node with at least information about the second left leaf node;
   committing the update of the first root node and the first right leaf node;
   releasing the lock to the first root node and the first right leaf node; and
   sending updated copies of the first root node and the first right leaf node to other hosts in a multi-host environment;
   wherein the maximum database size and transaction rate is increased by allowing access by multi-hosts to all other nodes in the first data structure during appending the second data structure.

2. The method of claim 1, wherein updating includes updating the first root node to point to the second root node and updating the first right leaf node to point to the second left leaf node.

3. The method of claim 1, wherein the lock is a retrieval lock and further comprising placing a global update lock on the first root node and the first right node.

4. The method of claim 3, wherein updating includes updating a record of the first root note with information from a record of the second root node.

5. The method of claim 1, wherein the first and second data structures are B+ tree structures.

6. The method of claim 1, further comprising after receiving a command to append, ensuring that the second data structure is not loaded into memory.

7. The method of claim 1, further comprising after releasing the global lock, allowing the second data structure to be loaded into memory.

8. The method of claim 1, further comprising preventing concurrent updates to the first data structure.

9. The method of claim 1, further comprising reading the first data structure into in-memory cache prior to updating to speed up the grafting process so that access to the first root node and first right leaf node can be restored.

10. A computer program product, comprising:
    a non-transitory computer readable medium comprising instructions which, when executed by a processor of a computing system, cause the processor to perform the steps of:
    creating and storing data into a first data structure having a first root node, a first right leaf node and a plurality of other leaf nodes and non-leaf nodes defining multiple hierarchical levels;
    allowing a search of the first data structure to proceed while creating a second data structure that includes a second root node, a second left leaf node and a plurality of leaf nodes and non-leaf nodes defining multiple hierarchical levels;

receiving a command to append the second data structure to the first data structure during searching the first data structure;

identifying the second left leaf node;

determining that the smallest value of the second left leaf node is greater than a largest value of the first right leaf node;

creating a lock for all hosts in the multi-host environment to the first root node and the first right leaf node of the first data structure while allowing access to the plurality of other leaf nodes and non-leaf nodes of the first data structure;

loading the first root node and the first right leaf node into memory;

updating the first root node and the first right leaf node with information about the second data structure, wherein the second data structure is appended to the first data structure by updating the first root node with at least information about the second root node and updating the first right leaf node with at least information about the second left leaf node;

committing the update of the first root node and the first right leaf node;

releasing the lock to the first root node and the first right leaf node; and sending updated copies of the first root node and the first right leaf node to other hosts in a multi-host environment.

11. The computer program product of claim 10, wherein updating includes updating the first root node to point to the second root node and updating includes updating the first right leaf node to point to the second left leaf node.

12. The computer program product of claim 10, wherein the lock is a retrieval lock and further comprising placing a global update lock on the first root node and the first right node.

13. The computer program product of claim 12, wherein updating includes updating a record of the first root note with information from a record of the second root node.

14. The computer program product of claim 10, wherein the first and second data structures are B+ tree structures.

15. The computer program product of claim 10, further comprising after receiving a command to append, ensuring that the second data structure is not loaded into memory.

16. The computer program product of claim 15, further comprising after releasing the global lock, allowing the second data structure to be loaded into memory.

17. The computer program product of claim 10, further comprising preventing concurrent updates to the first data structure.

18. The computer program product of claim 10, further comprising reading the first data structure into in-memory cache prior to updating to speed up the grafting process so that access to the first root node and first right leaf node can be restored.

* * * * *